United States Patent
Kim et al.

(10) Patent No.: US 12,096,043 B2
(45) Date of Patent: *Sep. 17, 2024

(54) VIDEO ENCODING METHOD FOR ENCODING DIVISION BLOCK, VIDEO DECODING METHOD FOR DECODING DIVISION BLOCK, AND RECORDING MEDIUM FOR IMPLEMENTING THE SAME

(71) Applicants: KOREA ADVANCED INSTITUTE OF SCIENCE AND TECHNOLOGY, Daejeon (KR); KOREAN BROADCASTING SYSTEM, Seoul (KR)

(72) Inventors: Mun Churl Kim, Daejeon (KR); Bum Shik Lee, Daejeon (KR); Jae Il Kim, Daejeon (KR); Chang Seob Park, Seoul (KR); Sang Jin Hahm, Seoul (KR); In Joon Cho, Seoul (KR); Keun Sik Lee, Seoul (KR); Byung Sun Kim, Goyang-si (KR)

(73) Assignees: KOREA ADVANCED INSTITUTE OF SCIENCE AND TECHNOLOGY, Daejeon (KR); KOREAN BROADCASTING SYSTEM, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,711

(22) Filed: Apr. 11, 2023

(65) Prior Publication Data
US 2023/0247229 A1    Aug. 3, 2023

Related U.S. Application Data

(63) Continuation of application No. 17/361,528, filed on Jun. 29, 2021, now Pat. No. 11,659,210, which is a
(Continued)

(30) Foreign Application Priority Data

Feb. 23, 2009 (KR) .................. 10-2009-0015013
Aug. 19, 2009 (KR) .................. 10-2009-0076753

(51) Int. Cl.
H04N 19/86        (2014.01)
H04N 19/103       (2014.01)
(Continued)

(52) U.S. Cl.
CPC ........... *H04N 19/86* (2014.11); *H04N 19/103* (2014.11); *H04N 19/117* (2014.11);
(Continued)

(58) Field of Classification Search
None
See application file for complete search history.

(56) References Cited

U.S. PATENT DOCUMENTS 5,241,395 A    8/1993 Chen
6,404,814 B1   6/2002 Apostolopoulos et al.
(Continued)

FOREIGN PATENT DOCUMENTS

CA    2659351 A1    1/2008
CN    1819658 A     8/2006
(Continued)

OTHER PUBLICATIONS

Phillips, W., "A Comparison of Four Hybrid block/object Image Coders", Signal Processing, vol. 54, Issue 1, pp. 103-107.
(Continued)

*Primary Examiner* — Mohammad J Rahman
(74) *Attorney, Agent, or Firm* — NSIP Law

(57) ABSTRACT

Disclosed are a method of encoding a division block in video encoding and a method of decoding a division block in video decoding. An input picture is divided into encoding unit
(Continued)

blocks. The encoding unit blocks are divided into sub-blocks. The sub-blocks are encoded by selectively using at least one of intra prediction encoding and inter prediction encoding. A decoding process is performed through a reverse process of the encoding method. When pixel values of an encoding unit block are encoded in video encoding, the flexibility in selecting an encoding mode is increased and the efficiency of encoding is increased.

1 Claim, 4 Drawing Sheets

Related U.S. Application Data continuation of application No. 16/572,704, filed on Sep. 17, 2019, now Pat. No. 11,076,175, which is a continuation of application No. 15/855,019, filed on Dec. 27, 2017, now Pat. No. 10,462,494, which is a continuation of application No. 15/258,655, filed on Sep. 7, 2016, now Pat. No. 9,888,259, which is a continuation of application No. 13/202,906, filed as application No. PCT/KR2010/001125 on Feb. 23, 2010, now Pat. No. 9,485,512.

(51) Int. Cl.
*H04N 19/117* (2014.01)
*H04N 19/122* (2014.01)
*H04N 19/124* (2014.01)
*H04N 19/13* (2014.01)
*H04N 19/14* (2014.01)
*H04N 19/159* (2014.01)
*H04N 19/176* (2014.01)
*H04N 19/61* (2014.01)
*H04N 19/80* (2014.01)
*H04N 19/172* (2014.01)
*H04N 19/174* (2014.01)
*H04N 19/182* (2014.01)

(52) U.S. Cl.
CPC ......... *H04N 19/122* (2014.11); *H04N 19/124* (2014.11); *H04N 19/13* (2014.11); *H04N 19/14* (2014.11); *H04N 19/159* (2014.11); *H04N 19/176* (2014.11); *H04N 19/61* (2014.11); *H04N 19/80* (2014.11); *H04N 19/172* (2014.11); *H04N 19/174* (2014.11); *H04N 19/182* (2014.11)

(56) References Cited

U.S. PATENT DOCUMENTS

| 6,917,648 | B1 | 7/2005 | Morimatsu et al. |
|---|---|---|---|
| 7,088,780 | B2 | 8/2006 | Vetro et al. |
| 7,181,072 | B2 | 2/2007 | Wang et al. |
| 7,362,809 | B2 | 4/2008 | Booth et al. |
| 7,397,857 | B2 | 7/2008 | Romanowski et al. |
| 7,657,111 | B2 | 2/2010 | Nonaka et al. |
| 8,085,844 | B2 | 12/2011 | Holcomb et al. |
| 8,442,337 | B2 | 5/2013 | Zuo et al. |
| 8,494,042 | B2 | 7/2013 | Park et al. |
| 8,498,335 | B2 * | 7/2013 | Holcomb ............... H04N 19/14 375/240.03 |
| 8,611,416 | B2 | 12/2013 | Hwang et al. |
| 8,817,868 | B2 * | 8/2014 | Holcomb ............... H04N 19/117 375/240 |
| 8,929,455 | B2 | 1/2015 | Cohen et al. |
| 9,420,293 | B2 | 8/2016 | Song et al. |
| 2002/0172283 | A1 | 11/2002 | Kawakatsu et al. |
| 2002/0176498 | A1 | 11/2002 | Frojdh et al. |
| 2002/0191695 | A1 | 12/2002 | Irvine et al. |
| 2004/0062309 | A1 | 4/2004 | Romanowski et al. |
| 2004/0165765 | A1 | 8/2004 | Sung et al. |
| 2004/0233989 | A1 | 11/2004 | Kobayashi et al. |
| 2005/0053294 | A1 * | 3/2005 | Mukerjee ............... H04N 19/51 375/E7.125 |
| 2005/0078750 | A1 | 4/2005 | Shen et al. |
| 2005/0147167 | A1 | 7/2005 | Dumitras et al. |
| 2005/0276323 | A1 | 12/2005 | Martemyanov et al. |
| 2006/0002470 | A1 | 1/2006 | Sakurai |
| 2006/0034532 | A1 | 2/2006 | Govindaswamy et al. |
| 2006/0104357 | A1 | 5/2006 | Burazerovic et al. |
| 2006/0146941 | A1 | 7/2006 | Cha et al. |
| 2006/0153297 | A1 | 7/2006 | Boyce |
| 2006/0176956 | A1 | 8/2006 | Ducloux et al. |
| 2006/0193388 | A1 | 8/2006 | Woods et al. |
| 2007/0009044 | A1 | 1/2007 | Tourapis et al. |
| 2007/0019729 | A1 | 1/2007 | Nakagomi et al. |
| 2007/0033494 | A1 | 2/2007 | Wenger et al. |
| 2007/0047648 | A1 | 3/2007 | Tourapis et al. |
| 2007/0047656 | A1 | 3/2007 | Kim et al. |
| 2007/0053620 | A1 | 3/2007 | Mizuno |
| 2007/0121731 | A1 | 5/2007 | Tanizawa et al. |
| 2007/0133676 | A1 | 6/2007 | Lee et al. |
| 2007/0133889 | A1 | 6/2007 | Horie et al. |
| 2007/0140352 | A1 | 6/2007 | Bhaskaran et al. |
| 2007/0198622 | A1 | 8/2007 | Jou |
| 2007/0253484 | A1 | 11/2007 | Zhao et al. |
| 2007/0297506 | A1 | 12/2007 | Yamanaka |
| 2007/0297518 | A1 | 12/2007 | Han et al. |
| 2008/0008250 | A1 * | 1/2008 | Mori ............... H04N 19/107 375/E7.176 |
| 2008/0056347 | A1 | 3/2008 | Chiu et al. |
| 2008/0082550 | A1 | 4/2008 | Ahopelto et al. |
| 2008/0084932 | A1 * | 4/2008 | Wang ............... H04N 19/70 375/E7.199 |
| 2008/0089597 | A1 | 4/2008 | Guo et al. |
| 2008/0126278 | A1 | 5/2008 | Bronstein et al. |
| 2008/0151995 | A1 | 6/2008 | Youn |
| 2008/0152005 | A1 | 6/2008 | Oguz et al. |
| 2008/0192824 | A1 | 8/2008 | Lim et al. |
| 2009/0003440 | A1 | 1/2009 | Karczewicz et al. |
| 2009/0016626 | A1 | 1/2009 | Zhang et al. |
| 2009/0046781 | A1 | 2/2009 | Moriya et al. |
| 2009/0219991 | A1 | 9/2009 | Po et al. |
| 2009/0245382 | A1 | 10/2009 | Ekman |
| 2009/0263032 | A1 | 10/2009 | Tanaka et al. |
| 2009/0268810 | A1 | 10/2009 | Dai |
| 2009/0268974 | A1 | 10/2009 | Takagi |
| 2009/0310677 | A1 | 12/2009 | Shiodera et al. |
| 2010/0027686 | A1 | 2/2010 | Zuo et al. |
| 2010/0166069 | A1 | 7/2010 | Goel |
| 2010/0208804 | A1 | 8/2010 | Yu et al. |
| 2010/0208806 | A1 | 8/2010 | Yu et al. |
| 2010/0211537 | A1 | 8/2010 | Gepperth |
| 2010/0208805 | A1 | 9/2010 | Yu et al. |
| 2010/0239015 | A1 | 9/2010 | Wang et al. |
| 2011/0110427 | A1 | 5/2011 | Teng et al. |
| 2011/0116545 | A1 | 5/2011 | Zan et al. |
| 2012/0201300 | A1 | 8/2012 | Kim et al. |
| 2013/0136179 | A1 | 5/2013 | Lim et al. |
| 2013/0202036 | A1 | 8/2013 | Nagori et al. |
| 2014/0079330 | A1 | 3/2014 | Zuo et al. |
| 2015/0334402 | A1 | 11/2015 | Song et al. |
| 2016/0381382 | A1 | 12/2016 | Oh et al. |
| 2017/0041616 | A1 | 2/2017 | Ramamurthy et al. |

FOREIGN PATENT DOCUMENTS

| CN | 1843038 A | 10/2006 |
|---|---|---|
| CN | 1320504 C | 6/2007 |
| CN | 101360239 A | 2/2009 |
| JP | 3220887 A | 9/1991 |
| JP | 2003-533101 A | 11/2003 |
| JP | 2003-533141 A | 11/2003 |
| JP | 2004-242318 A | 8/2004 |
| JP | 2004-528791 A | 9/2004 |
| JP | 2005-123732 A | 5/2005 |
| JP | 2006-516072 A | 6/2006 |

(56) References Cited

FOREIGN PATENT DOCUMENTS

| | | | |
|---|---|---|---|
| JP | 2006-517364 A | 7/2006 |
| JP | 2006-222968 A | 8/2006 |
| JP | 2006-287973 A | 10/2006 |
| JP | 2007-201558 A | 8/2007 |
| JP | 2008-522537 A | 6/2008 |
| JP | 2008-219870 A | 9/2008 |
| JP | 2017-113145 A | 6/2017 |
| JP | 2021-183506 A | 12/2021 |
| KR | 10-2001-0062140 A | 7/2001 |
| KR | 10-2005-0089876 A | 9/2005 |
| KR | 10-2006-0090749 A | 8/2006 |
| KR | 10-0631714 B1 | 10/2006 |
| KR | 10-2009-0065401 A | 6/2009 |
| KR | 10-2011-0017719 A | 2/2011 |
| WO | WO 03/021971 A1 | 3/2003 |
| WO | WO 03/026315 A1 | 3/2003 |
| WO | WO 2004/036501 A2 | 4/2004 |
| WO | WO 2005/022919 A1 | 3/2005 |
| WO | WO 2007/034918 A1 | 3/2007 |
| WO | WO 2008/012918 A1 | 1/2008 |
| WO | WO 2008/027192 A2 | 3/2008 |
| WO | WO 2008/088140 A1 | 7/2008 |
| WO | WO 2008/120434 A1 | 10/2008 |
| WO | WO 2008/126135 A1 | 10/2008 |

OTHER PUBLICATIONS

Heiko Schwarz, et al. "Tree-Structured Macroblock Partition." 15th Meeting of the ITU-Telecommunications Standardization Sector Study Group Video Coding Experts Group (VCEG), XP030003350, Pattaya, Thailand, Dec. 2001. (6 pages in English).

Mathias Wien, et al. "Hybrid Video Coding Using Variable Size Block Transforms." Visual Communications and Image Processing 2002, XP030080600, San Jose, CA, Jan. 2002: 1040-1051.

Joint Video Team, "Draft ITU-T Recommendation H.264 (a.k.a. "H.26L")." 16th Meeting of the ITU-Telecommunications Standardization Sector Study Group Video Coding Experts Group (VCEG), XP030003397, Fairfax, Virginia, USA, May 2002. (142 pages in English).

Peter List, et al. "Adaptive Deblocking Filter." IEEE Transactions on Circuits and Systems for Video Technology, XP011221094, 13.7 (2003): 614-619.

Wien, Mathias. "Variable block-size transforms for H. 264/AVC." *IEEE Transactions on Circuits and Systems for Video Technology* 13.7 (2003): 604-613. (10 pages in English).

Wien, Mathias, "Variable Block-Size Transforms for H.264/AVC", *IEEE Transactions on Circuits and Systems for Video Technology*, vol. 13, No. 7, Jul. 2003 (pp. 604-610).

Shin et al. "Variable Block-Based Deblocking Filter for H.264/AVC", IEEE International Conference on Multimedia and Expo, 2007, pp. 436-439, Jul. 2-5, 2007.

Ma, Siwei, et al. "High-definition video coding with super-macroblocks." *Visual Communications and Image Processing 2007*. vol. 6508. International Society for Optics and Photonics, 2007. (12 pages in English).

Lee, Kyohyuk et al., "Technical considerations for Ad Hoc Group on New Challenges in Video Coding Standardization", International Organisation for Standardisation Organisation Internationale De Normalisation ISO/IEC JTC1/SC29/WG11 Coding of Moving Pictures and Audio, Jul. 2008, Hannover, Germany (pp. 1-9).

Jaeil Kim et al., "Enlarging MB Size for High Fidelity Video Coding Beyond HD." 36th Meeting of the ITU-Telecommunications Standardization Sector Study Group Video Coding Experts Group (VCEG), San Diego, USA, Oct. 2008. (6 pages in English).

P. Chen, et al., "Video Coding Using Extended Block Sizes". 36th Meeting of the ITU—Telecommunications Standardization Sector, Study Group 16 (Video Coding Experts Group, VCEG), Question 6, Oct. 2008, San Diego, USA. (3 pages in English).

Peisong Chenn et al., "Video Coding Using Extended Block Sizes." ITU—Telecommunications Standardization Sector Study Group, Com 16-C123-E, Jan. 2009. (4 pages in English).

Japanese Office Action issued on Feb. 5, 2014 in counterpart Japanese Patent Application No. 2011-551018. (2 pages in Japanese).

Korean Office Action issued on Nov. 22, 2014 in counterpart Korean Application No. 10-2011-0088186 (4 pages in Korean).

Korean Office Action issued on Apr. 21, 2015 in counterpart Korean Application No. 10- 2015-0010081 (9 pages in Korean).

Extended European Search Report issued on Nov. 13, 2015 in counterpart European Application No. 10743990.3 (11 pages in English).

Japanese Office Action issued on Mar. 7, 2016 in counterpart Japanese Patent Application No. 2011-551018. (2 pages in Japanese).

Japanese Office Action issued on Jun. 27, 2016 in counterpart of Japanese Patent Application No. 2015-040751 (3 pages in Japanese).

Japanese Office Action issued on Aug. 18, 2016 in counterpart of Japanese Patent Application No. 2011-551018 (3 pages in Japanese).

United States Office Action issued on Oct. 20, 2016, in corresponding United States U.S. Appl. No. 15/258,518 (14 pages, in English).

United States Final Office Action issued on May 1, 2017 in corresponding United States U.S. Appl. No. 15/258,460 (9 pages in English).

United States Final Office Action issued on May 2, 2017 in corresponding United States U.S. Appl. No. 15/258,627 (9 pages in English).

Japanese Office Action issued on May 17, 2017 in counterpart Japanese Patent Application No. 2015-040751 (3 pages in Japanese).

Japanese Office Action issued on Jun. 4, 2018 in counterpart Japanese Patent Application No. 2017-113142 (6 pages, in Japanese).

Chinese Office Action issued on Jun. 5, 2018 in counterpart Chinese Patent Application No. 201610346399.8 (10 pages, in Chinese).

Korean Office Action issued on Sep. 13, 2018 in corresponding Korean Patent Application No. 10-2018-0051937 (7 pages in Korean).

Japanese Office Action issued on Dec. 23, 2019 in counterpart Japanese Patent Application No. 2017-113145 (5 pages in Japanese).

Summons to Attend Oral Proceedings issued on Apr. 23, 2020 in counterpart European Patent Application No. 10 743 990.3 (8 pages in English).

Decision of Refusal issued on Aug. 10, 2020 in counterpart European Patent Application No. 10 743 990.3-1230 (31 pages in English).

Korean Notice Of Allowance issued on Feb. 23, 2021 in counterpart Korean Patent Application No. 10-2019-0174503 (3 pages in Korean, 1 page in English).

Japanese Office Action issued on May 10, 2021 in counterpart Japanese Patent Application No. 2020-076069. (6 pages in English, 5 pages in Japanese).

Japanese Office Action issued on Oct. 11, 2022 in counterpart Japanese Patent Application No. 2021-183505. (6 pages in English, 5 pages in Japanese).

* cited by examiner

VIDEO ENCODING METHOD FOR ENCODING DIVISION BLOCK, VIDEO DECODING METHOD FOR DECODING DIVISION BLOCK, AND RECORDING MEDIUM FOR IMPLEMENTING THE SAME

CROSS REFERENCE TO RELATED APPLICATIONS

This application is a continuation application of U.S. patent application Ser. No. 17/361,528, filed on Jun. 29, 2021, which is a continuation application of U.S. patent application Ser. No. 16/572,704, filed on Sep. 17, 2019, which is a Continuation application of U.S. application Ser. No. 15/855,019 filed on Dec. 27, 2017, now U.S. Pat. No. 10,462,494 issued on Oct. 29, 2019, which is a Continuation of application Ser. No. 15/258,655 filed on Sep. 7, 2016, now U.S. Pat. No. 9,888,259 issued on Feb. 6, 2018, which is a Continuation of application Ser. No. 13/202,906 having a 371(c) date of Oct. 10, 2011, now U.S. Pat. No. 9,485,512 issued on Nov. 1, 2016, which is a U.S. national stage application of International Application No. PCT/KR2010/001125 filed on Feb. 23, 2010, which claims the benefit of Korean Patent Application No. 10-2009-0076753 filed on Aug. 19, 2009 and Korean Patent Application No. 10-2009-0015013 filed on Feb. 23, 2009, in the Korean Intellectual Property Office, the entire disclosures of which are incorporated herein by reference for all purposes.

TECHNICAL FIELD

The present invention relates to video encoding and decoding methods capable of dividing an input picture in units of blocks and encoding and decoding a division block by simultaneously using intra and inter prediction encoding, and more particularly to video encoding and decoding methods of encoding and decoding a division block through inter and intra predictions in video encoding that can improve encoding efficiency and further improve encoding efficiency by encoding a block video signal by use of a square transform or a non-square transform according to a size of the division block.

BACKGROUND ART

International Organization for Standardization/International Electrotechnical Commission (ISO/IEC) 14496-10 (Moving Picture Experts Group (MPEG)-4 Part 10 Advanced Video Coding) or H.264, which is video compression/encoding technology jointly standardized in ISO/IEC and International Telecommunication Union-Telecommunication Standardization (ITU-T), an ISO/IEC 14496-10 Amendment 3 (MPEG-4 Scalable Video Coding) standard, a video codec-1 (VC-1), which is an Society of Motion Picture and Television Engineers (SMPTE) standard, an audio video coding standard (AVS), and the like have achieved significant advance in terms of video data compression efficiency.

There are various factors for improving video compression efficiency. In particular, a process of sub-dividing a macroblock in units of 16×16, 16×8, 8×16, 8×8, 8×4, 4×8, and 4×4, prediction-encoding sub-blocks, and encoding a block for minimizing cost in an optimum block mode in terms of rate-distortion cost is performed, unlike existing video encoding standards (MPEG-1 Video, MPEG-2 Video, MPEG-4 Part 2 Visual, H.261, H.263, and the like) in which prediction encoding is performed after a size of a picture to be encoded is divided in units of macroblocks (each of which has 16×16 pixels).

Thereby, a micro motion or a motion of a complex video may be more effectively predicted, and compression efficiency may be significantly improved by significantly reducing a generated residual signal.

FIG. 1 is a diagram showing seven types of motion prediction block divisions used in H.264 as division block types of 16×16 macroblock unit blocks to be encoded in an H.264/advanced video coding (AVC) encoder of the related art.

In a block-based prediction encoding method as shown in FIG. 1, an encoding process is generally performed by dividing an input video into macroblock units having a size of 16×16. In particular, in the ISO/IEC 14496-10 (MPEG-4 Advanced Video Coding) or H.264 standard, prediction encoding is performed by dividing a macroblock into seven types of sub-blocks as shown in FIG. 1 and finally selecting a block for minimizing the rate-distortion cost.

When intra encoding of sub-blocks into which a 16×16 macroblock to be encoded is divided is performed, the macroblock is subjected to intra prediction encoding in a size of one 16×16 pixel unit. Alternatively, after the macroblock is divided into sub-blocks, intra prediction encoding of four 8×8 blocks or sixteen 4×4 blocks is performed.

In general, the above-described intra prediction encoding technique efficient in terms of the reduction of the number of cases of various block modes in low definition video encoding, but has a problem in high definition (HD) or ultra high definition (UHD) video encoding. That is, in the case of a super-macroblock having a size of 32×32 or more to which a 16×16 macroblock as an encoding unit block is extended, encoding efficiency is degraded if all divided block modes within the super-macroblock are applied to the same intra prediction based on a 16×16, 8×8, or 4×4 block as in the existing method.

In other words, it should be noted that all divided blocks are encoded by only intra or inter prediction encoding in a prediction encoding method based on division blocks in the related art. That is, only one of the intra prediction encoding and the inter prediction encoding is selected and applied to a division block without applying both the intra prediction encoding and the inter prediction encoding to the division block. This may result in a gain of encoding efficiency in image or video compression at an H D rate or less due to simplicity of a syntax expressing a block encoding mode obtained by applying only one of intra and inter encoding, but may become a factor that degrades the encoding efficiency when a unit of encoding is a super-macroblock that has the same or greater size than a macroblock.

DISCLOSURE OF INVENTION

Technical Problem

The present invention has been made to solve the above-described problem, and an object of the invention is to provide a more effective prediction encoding method that performs an encoding process by extending a method of selecting intra or inter prediction encoding for sub-division blocks of a divided block during video encoding so that both intra and inter prediction encoding modes can be selected and selectively applying a square or non-square transform kernel to a residual signal according to a block size after motion compensation of the divided block.

Another object of the present invention is to provide a computer-readable recording medium for implementing the method.

Technical Solution

According to an example embodiment of the present invention for achieving the above-described object, there is provided a video encoding method, including: dividing an input picture into encoding unit blocks; dividing the encoding unit blocks into sub-blocks; and encoding the sub-blocks by selectively using at least one of intra prediction encoding and inter prediction encoding.

The video encoding method may further include: transforming residual signals through the encoding unit blocks and the sub-blocks by selectively applying a variable block-size transform kernel according to a block size; quantizing the transformed residual signals; and entropy-encoding results of quantization.

The residual signals through the sub-blocks may be encoded by selectively applying one or more de-blocking filters according to the block size and an encoding type.

A size of the encoding unit block may be a square having an N*N size, and the encoding unit block may be divided into one or more square or non-square sub-blocks having any size.

When the square or non-square sub-blocks are encoded using the inter prediction encoding, the sub-blocks may be encoded by selecting one of intra prediction encoding methods.

When the intra prediction encoding or inter prediction encoding of the square or non-square sub-blocks is performed, the entropy encoding may be performed by scanning a quantized transform coefficient selected according to a block size.

The square sub-blocks may be transformed by applying a square transform kernel.

When the square sub-blocks are transformed by applying the square transform kernel, a square transform kernel having a size of the smaller or same number of pixels may be applied by comparing the number of horizontal pixels of the square sub-block with the number of vertical pixels.

The non-square sub-blocks may be transformed by applying a non-square transform kernel.

When the non-square sub-blocks are transformed by applying the non-square transform kernel, a non-square transform kernel having a size of the smaller or same number of pixels may be applied by comparing the number of horizontal pixels of the non-square sub-block with the number of vertical pixels.

According to another example embodiment of the present invention, there is provided a method of encoding a division block in video encoding, including: (a) inputting a picture to be encoded; (b) dividing the input picture into encoding unit blocks; (c) dividing each input encoding unit block into sub-blocks; (d) performing intra prediction encoding and inter prediction encoding of the encoding unit block and the sub-blocks and selecting one block type among the encoding unit block and the sub-blocks; and (e) performing intra prediction encoding and/or inter prediction encoding of the encoding unit block and the sub-blocks by use of a prediction result of the block type.

According to still another example embodiment of the present invention, there is provided a method of encoding a division block in video encoding, including: (a') inputting a picture to be encoded; (b') dividing the input picture into encoding unit blocks; (c') determining whether to perform inter prediction encoding of a current input picture; (d') initializing an index of a sub-block of an encoding unit block to be encoded in the input picture if the current input picture corresponds to inter prediction; (e') selecting a block mode of the encoding unit block to be encoded; (f') determining whether to perform both intra and inter prediction encoding of the selected block mode; (g') performing the intra and inter prediction encoding of the selected block mode if it is determined to perform both the intra and inter prediction encoding of the selected block mode; (h') storing a prediction encoding result and a rate-distortion cost value of step (g'); (i') if the selected block mode is a final mode, determining encoding by comparing rate-distortion costs for respective block modes and selecting a final block mode for the encoding unit block; (j') determining whether a current encoding unit block is a final block in the current input picture; and (k') determining whether the current input picture is a final picture if the current encoding unit block is the final block in the current input picture, and iterating steps (a') to (j') until the current input picture becomes the final picture.

The method may further include: after step (c'), performing the intra prediction encoding if the current input picture does not correspond to the inter prediction.

The method may further include: after step (f'), performing the inter prediction encoding of the selected block mode if it is not determined to perform both the intra and inter prediction encoding of the selected block mode.

The method may further include: after step (g'), obtaining a residual signal through motion prediction and compensation if the inter prediction encoding of the selected block mode is performed; transforming the selected block by use of the residual signal; quantizing the transformed selected block; and entropy-encoding a result of quantization.

The method may further include: after step (g'), obtaining a residual signal through the intra prediction encoding if the intra prediction encoding of the selected block mode is performed; transforming the selected block by use of the residual signal; quantizing the transformed selected block; and entropy-encoding a result of quantization.

The method may further include: performing a transform by selectively applying a transform kernel according to a block size when the selected block is transformed using the residual signal.

According to still another example embodiment of the present invention, there is provided a method of decoding a division block in video decoding, comprising: (A) inputting a bitstream to be decoded; (B) determining whether the input bitstream corresponds to inter prediction; (C) performing intra prediction encoding if the input bitstream is subjected to intra prediction encoding; (D) analyzing a slice if the input bitstream corresponds to the inter prediction; (E) analyzing a unit encoding block within the slice; (F) decoding an encoding mode of a unit encoding sub-division block; (G) analyzing whether a sub-division encoding block is an inter prediction encoding block; (H) performing inter prediction decoding if the sub-division encoding block corresponds to the inter prediction; (I) performing intra prediction decoding if the sub-division encoding block corresponds to intra prediction; (J) configuring unit decoding block pixels from sub-division decoding results; (K) configuring slice pixels from decoding unit block results; and (K) configuring a picture from slice pixel configuration results. Accordingly, it is possible to perform intra and/or inter prediction decoding.

Step (C) may further include: if the unit encoding block is a super-macroblock having the same or greater size than a 16×16 macroblock, performing intra prediction decoding by decoding a sub-division block encoding mode corresponding to the size of the super-macroblock.

Step (C) may further include: performing intra prediction decoding by applying a de-blocking filter corresponding to a size of a sub-division block.

Step (C) may further include the step of: performing intra prediction decoding by applying a de-blocking filter according to a size of a sub-division block.

Step (F) may further include: if the unit encoding block is a super-macroblock having the same or greater size than a 16×16 macroblock, decoding a sub-division block encoding mode corresponding to the size of the super-macroblock.

Step (H) may further include: performing intra prediction decoding by applying a square or non-square transform kernel corresponding to a size of a sub-division block and decoding an encoded quantized transform coefficient.

Step (H) may further include: performing intra prediction decoding by applying an inverse quantization method according to a size of a sub-division block and a decoding mode condition of a peripheral decoding block and decoding an encoded quantized transform coefficient.

Step (H) may further include: performing inter prediction decoding by applying a de-blocking filter corresponding to a size of a sub-division block.

According to yet another example embodiment of the present invention, there is provided a computer-readable recording medium storing a program for causing a computer to execute the above-described method.

Advantageous Effects

When pixel values of an encoding unit block are encoded in video encoding according to the present invention, a divided block is encoded in an intra or inter prediction encoding mode by applying at least one of intra prediction encoding and inter prediction encoding to a divided sub-block or its sub-division blocks, and prediction encoding is performed using both intra and inter predictions for an encoding unit block or its sub-division blocks, so that the flexibility of encoding mode selection can be increased and the efficiency of encoding can be increased.

In prediction encoding based on division blocks according to the present invention, each division block is encoded by selectively applying a size of a variable block-size transform kernel according to a size of the division block so that both the intra and inter predictions can be applied to sub-division blocks. Therefore, it is possible to significantly improve encoding efficiency.

BEST MODE FOR CARRYING OUT THE INVENTION

Figure 1:
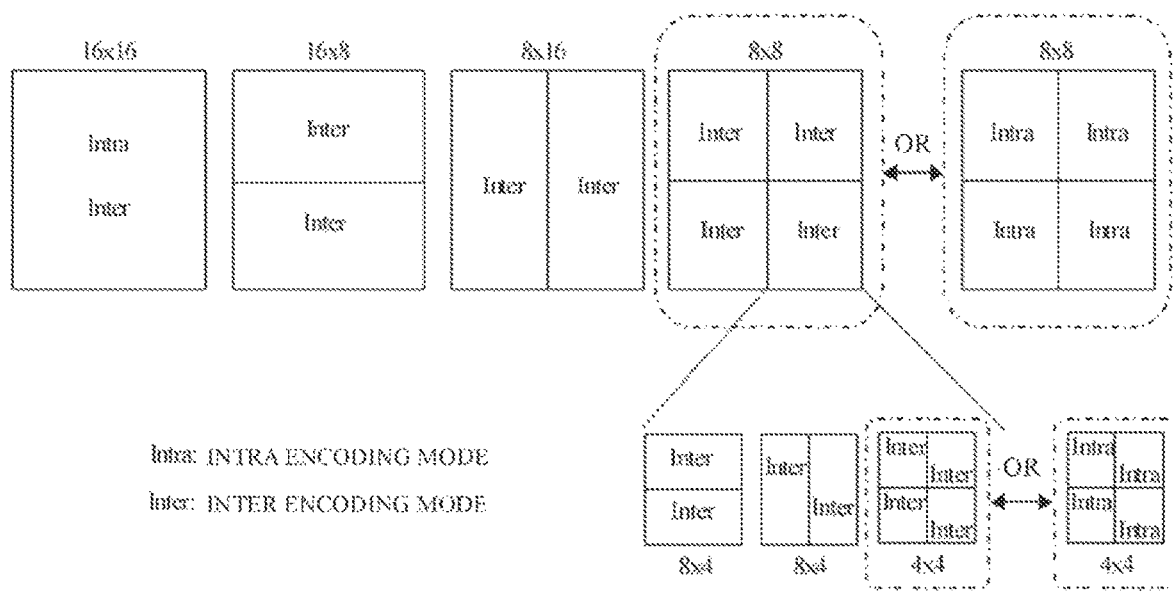
FIG. 1 is a diagram showing division block types of 16×16 macroblock unit blocks to be encoded in an H.264/advanced video coding (AVC) encoder of the related art.

Hereinafter, example embodiments of the present invention will be described in detail with reference to the accompanying drawings. The same elements are denoted by the same reference numerals throughout the drawings. Detailed description related to well-known functions or configurations will be omitted if they make the subject matter of the present invention unclear.

Figure 2:
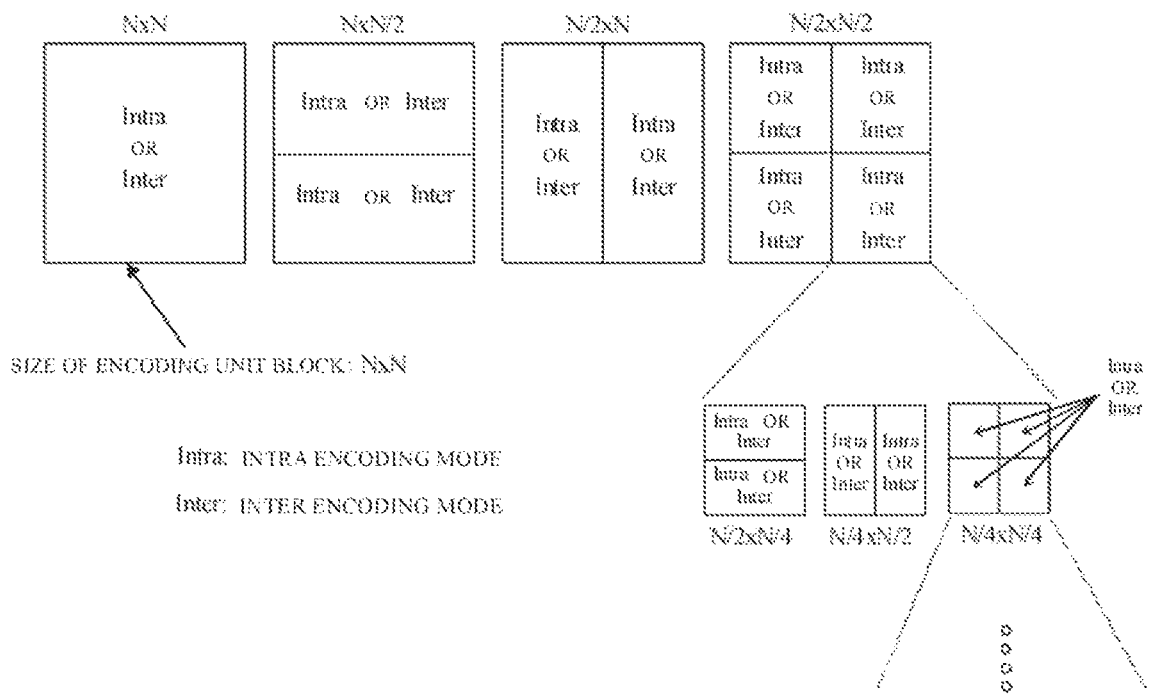
FIG. 2 is a diagram showing super-macroblock unit blocks and division block types for intra or inter prediction encoding in an encoder according to an example embodiment of the present invention.

FIG. 2 is a diagram showing super-macroblock unit blocks and division block types for intra or inter prediction encoding in an encoder according to an example embodiment of the present invention. FIG. 2 is a diagram showing an example of super-macroblocks, which have larger sizes than a macroblock of a 16×16 pixel unit, and block division types applied to an example embodiment of the present invention.

As shown in FIG. 2, a process of dividing a super-macroblock into sub-blocks and intra or inter prediction encoding the division blocks is performed, and the super-macroblock is encoded so that both intra and inter prediction encoding modes can be used as a final encoding mode. Therefore, it is possible to very effectively increase video encoding efficiency. In practice, it is possible to perform encoding by selecting a block mode capable of minimizing rate-distortion cost as shown in Equation 1.

$$J_{MODE}(s,r,\text{MODE}|QP,\lambda_{MODE}) = SSD(s,r,\text{MODE}|QP) + \lambda_{MODE} R(s,r,\text{MODE}|QP)$$  Equation 1

Here, $J_{MODE}$ denotes a rate-distortion function for a block encoding mode, s denotes an original block pixel input to be encoded, r denotes a reference video pixel input, QP denotes a quantization parameter, denotes a Lagrange multiplier dependent on a mode, and MODE denotes a division block mode type.

Also, if transform encoding is applied to a residual signal of a super-macroblock having an increased size, it is possible to increase encoding efficiency by selectively applying a square transform kernel having a size of 16×16 or more, which is greater than existing sizes of 4×4 and 8×8, or a non-square transform kernel having a size of 16×8, 8×16, or more for a non-square transform according to a size of a division block.

If the square transform kernel having the size of 16×16 or more is applied to the super-macroblock, it is possible to carry out a calculation as shown in Equation 2.

$$Y = AX$$  Equation 2

Here, X denotes an N×N input video signal matrix, A denotes an N×N square transform kernel matrix, and Y denotes a transform coefficient matrix. If a sub-block after division is a non-square block, a transform is performed as shown in Equation 3.

$$Y = A_1 X A_2$$  Equation 3

Here, when an input video signal X is an M×(M/2) matrix, $A_1$ denotes an M×M square transform kernel matrix, $A_2$ denotes an (M/2)×(M/2) square transform kernel matrix, and Y denotes a transform coefficient matrix.

When a square or non-square kernel transform is applied according to an example embodiment of the present invention, it is preferable to perform transform encoding by performing a comparison with the smaller number of pixels between the number of horizontal pixels and the number of vertical pixels of a division block and applying a kernel having a size that is equal to or less than the smaller number of pixels.

Figure 3:
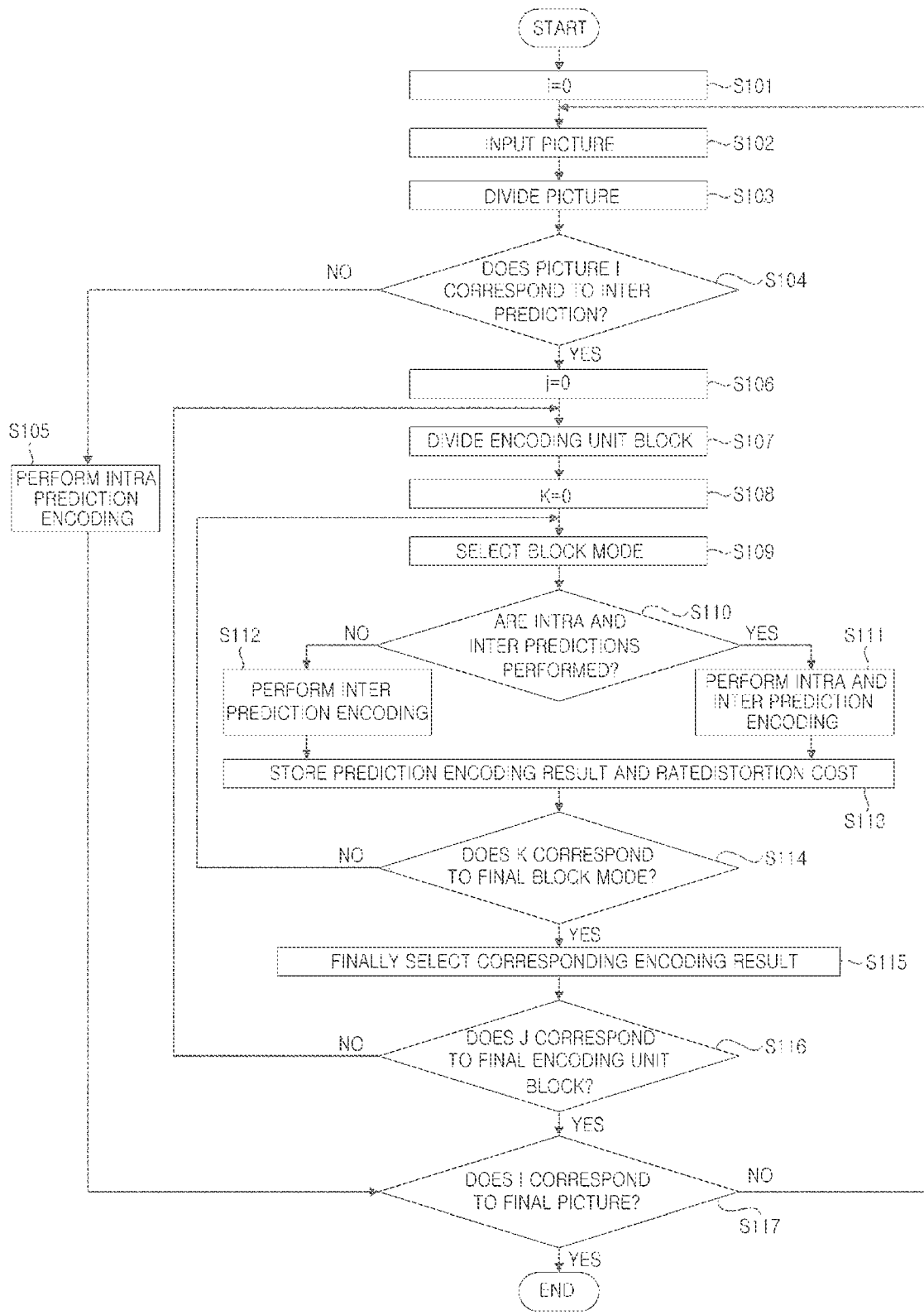
FIG. 3 is a flowchart illustrating a method of encoding a division block in video encoding according to an example embodiment of the present invention.

FIG. 3 is a flowchart illustrating a method for encoding a division block in video encoding according to an example embodiment of the present invention.

Referring to FIG. 3, first, an index of a picture i to be encoded is initialized (i=0) (S101). The picture i is input in sequence for encoding (S102).

Next, the input picture i is divided into encoding unit blocks (S103). In an example embodiment of the present invention, the encoding unit block may be a macroblock or super-macroblock.

Next, it is checked whether to perform inter prediction encoding of a current picture i (S104). If the current picture i does not correspond to inter prediction, intra prediction encoding is performed (S105). Otherwise, if the current picture i corresponds to inter prediction, an index of an encoding unit block j to be encoded within the one picture i is initialized (j=0) (S106).

Thereafter, the unit block j to be encoded is divided into sub-blocks (S107). An index of a sub-block mode k is initialized (k=0) (S108). One of sub-block modes k is selected (S109).

It is checked whether or not to perform intra and inter predictions for the sub-block mode to be encoded in the encoding unit block (S110). If it is checked to perform the intra and inter predictions, intra and inter encoding are performed (S111). Otherwise, only inter prediction encoding is performed (S112). A prediction encoding result and a rate-distortion cost value are stored as encoding results (S113).

It is checked whether the sub-block mode k is a final block node (S114). If the sub-block mode k is not the final block mode, steps S109 to S113 are iterated for the next block mode. On the other hand, if the sub-block mode k is the final block mode, an optimum division block is determined and corresponding encoding results are finally selected (S115).

It is determined whether a current encoding unit block j is a final block in the current picture i (S116). If the current encoding unit block j is not the final block, steps S107 to S115 are iterated by inputting the next encoding unit block.

If it is determined in step S116 that the current encoding unit block j is the final block in the current picture i, it is checked whether the current picture i is a final picture (S117). If the current picture i is the final picture, the algorithm ends. Otherwise, the algorithm returns to step S102, the next picture is input, and steps S102 to S116 are iterated.

Figure 4:
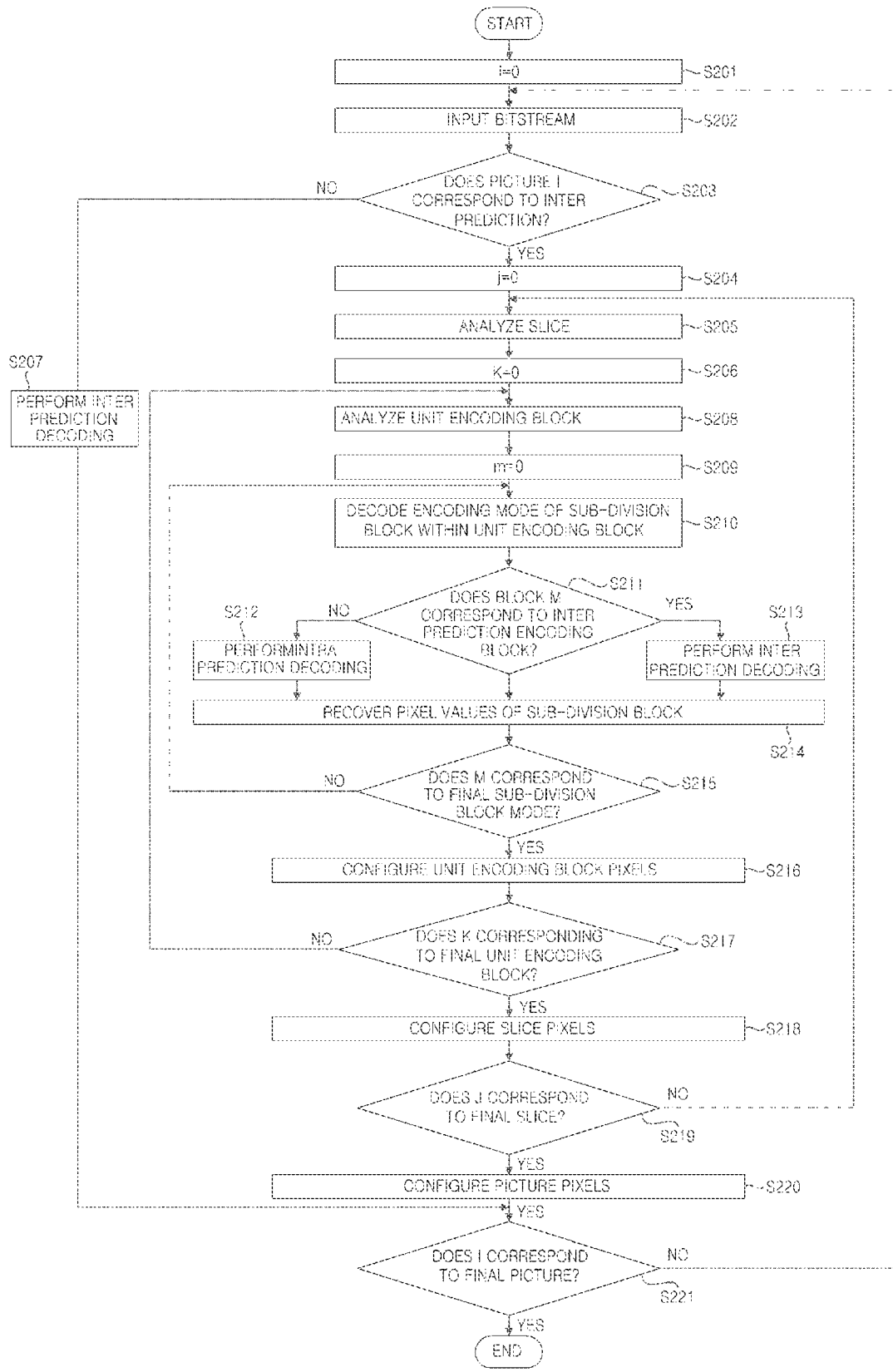
FIG. 4 is a flowchart illustrating a method of decoding a bitstream encoded in a video division block mode according to an example embodiment of the present invention.

FIG. 4 is a flowchart illustrating a method of decoding a bitstream encoded in a video division block mode according to an example embodiment of the present invention.

Referring to FIG. 4, first, an index of a picture i to be decoded is initialized (i=0) (S201). An encoded picture bitstream i is input in sequence for decoding (S202).

Next, it is checked whether an input picture bitstream i corresponds to inter prediction encoding (S203). If a current picture bitstream i does not correspond to the inter prediction encoding, intra prediction decoding is performed (S207). Otherwise, if the input picture bitstream i corresponds to the inter prediction encoding, an index of a slice j to be decoded within one picture i is initialized (j=0) (S204).

Next, slice information regarding the input picture bitstream is analyzed (S205). An index of a unit decoding block j to be decoded within each slice within one picture i is initialized (k=0) (S206). In an example embodiment of the present invention, the decoding unit block may be a macroblock or a super-macroblock.

Next, after information regarding each unit encoding block is analyzed (S208), an index of a division sub-block within the unit encoding block is initialized (m=0) (S209). Thereafter, an encoding mode of a division sub-block within the unit encoding block is decoded (S210). After it is checked whether the division sub-block is an inter prediction encoding block (S211), inter prediction decoding is performed if the sub-block is the inter prediction encoding block (S213), and intra prediction encoding is performed if the sub-block is an intra prediction encoding block or mode (S212).

Thereafter, pixel values of the sub-division block are recovered using sub-block encoding results (S214). After it is checked whether a current sub-division block m is the final block (S215), pixel values of a unit decoding block are configured if the current sub-division block m is the final block (S216). Otherwise, the algorithm returns to step S210 for decoding the next division sub-block, and steps S210 to S214 are performed.

After it is checked whether a current unit encoding block k is a final unit encoding block (S217), slice pixels are configured if the current unit encoding block k is the final unit encoding block (S218). Otherwise, the algorithm returns to step S208, and steps S208 to S216 are performed. After it is checked whether a current slice j is a final slice (S219), picture pixels are configured if the current slice j is the final slice (S220). Otherwise, steps S205 to S218 are performed. After it is determined whether a current picture i is a final picture (S221), the algorithm ends if the current picture i is the final picture. Otherwise, the algorithm returns to step S202, the next bitstream is input, and steps S202 to S220 are performed.

In video encoding according to an embodiment of the present invention, an input video is divided into encoding unit blocks. After the encoding unit block is sub-divided into sub-blocks, each sub-division block is encoded by selectively using at least one of intra prediction and inter prediction.

Thereby, encoding can be performed using both inter and intra prediction sub-block modes in an encoding mode of an encoding unit block and simultaneously a variable block-size transform kernel is selectively applied, so that encoding efficiency can be improved.

In video decoding according to an example embodiment of the present invention, it is possible to decode a compressed bitstream with improved encoding efficiency by performing the reverse process of encoding.

As another example embodiment of the present invention, the above-described method of encoding a division block in video encoding can be implemented as computer-readable codes on a computer-readable recording medium. The computer-readable recording medium includes all types of recording devices storing data readable by a computer system.

Examples of the computer-readable recording medium include a read only memory (ROM), a random access memory (RAM), a compact disk-read only memory (CD-ROM), a magnetic tape, a hard disk, a floppy disk, a mobile storage, a flash memory, an optical data storage, etc. Furthermore, the computer-readable recording medium may be implemented in the form of carrier waves (e.g., transmission over the Internet).

Further, the computer-readable recording medium is distributed to computer systems connected to each other through a computer communication network, so that the computer-readable codes can be stored in a distribution manner and executed thereby.

Although preferred embodiments of an inter prediction encoding method and/or an inter prediction encoding method in video encoding and decoding methods, which are reverse processes thereof, have been described, the example embodiments are illustrative and the present invention is not limited thereto. Those skilled in the art will understand that various modifications and changes may be made therein without departing from the spirit and scope of the invention as defined by the appended claims.

Sequence Listing Free Text

Encoding, decoding, inter prediction, intra prediction, transform kernel, square transform kernel, non-square transform kernel, quantization, MPEG, rate-distortion cost, H.264/MPEG-4 Part 10 Advanced Video Coding.

The invention claimed is:

1. An apparatus for video decoding, the apparatus comprising:
   a receiver configured to receive a video data sequence of encoded video data,
   wherein the video data sequence includes a slice and the slice includes coding unit blocks,
   wherein the coding unit blocks are divided into first sub-coding unit blocks,
   wherein at least one of the first sub-coding unit blocks is divided into second sub-coding unit blocks, and
   wherein one of the divided first or second sub-coding unit blocks is a square block; and
   a decoder configured to:
   decode an encoding mode corresponding to a sub-coding unit block among the divided first or second sub-coding unit blocks;
   perform either an intra prediction or an inter prediction on the corresponding sub-coding unit block based on the decoded encoding mode; and
   transform residual signals of the corresponding sub-coding unit block,
   wherein at least one of variable sizes of transform kernels is selectively applied to the corresponding sub-coding unit block,
   wherein the at least one of variable sizes of transform kernels is selected according to a size of the corresponding sub-coding unit block, and
   wherein the at least one of variable sizes of transform kernels is smaller than the sizes of the respective corresponding sub-blocks.

* * * * *